United States Patent
Nixon et al.

(10) Patent No.: US 6,815,468 B2
(45) Date of Patent: Nov. 9, 2004

(54) RADIATION-CURABLE COMPOSITION

(75) Inventors: Keith Edward Nixon, Kent (GB); Angelique Catherine Joyce Runacre, Kent (GB)

(73) Assignee: Sericol Limited, Kent (GB)

( * ) Notice: Subject to any disclaimer, the term of this patent is extended or adjusted under 35 U.S.C. 154(b) by 100 days.

(21) Appl. No.: 10/168,357

(22) PCT Filed: Dec. 15, 2000

(86) PCT No.: PCT/GB00/04798

§ 371 (c)(1), (2), (4) Date: Oct. 16, 2002

(87) PCT Pub. No.: WO01/61416

PCT Pub. Date: Aug. 23, 2001

(65) Prior Publication Data

US 2003/0138576 A1 Jul. 24, 2003

(30) Foreign Application Priority Data

Dec. 20, 1999 (GB) ............................................. 9930041

(51) Int. Cl.[7] .................................................. C08J 3/28
(52) U.S. Cl. ............................ 522/75; 522/79; 522/81; 522/83; 522/84; 522/113; 522/114
(58) Field of Search .............................. 522/75, 79, 81, 522/83, 84, 113, 114

(56) References Cited

U.S. PATENT DOCUMENTS

| | | | | |
|---|---|---|---|---|
| 5,242,719 A | * | 9/1993 | Medford et al. | ............ 427/515 |
| 5,635,544 A | * | 6/1997 | Tamura et al. | ................ 522/79 |
| 6,403,673 B2 | * | 6/2002 | Groves | ........................ 522/155 |

FOREIGN PATENT DOCUMENTS

| | | |
|---|---|---|
| EP | 0 475 592 | 3/1992 |
| EP | 0 549 946 | 7/1993 |
| WO | WO 98/49604 | 11/1998 |

* cited by examiner

*Primary Examiner*—Nathan M. Nutter
(74) *Attorney, Agent, or Firm*—Reed Smith LLP

(57) ABSTRACT

A radiation-curable composition for use as a base coat in printing on plastic substrates such as polycarbonate. The radiation-curable composition comprises: (i) an ethylenically unsaturated monomer that is capable of being photopolymerized; (ii) a photoinitiator that is capable of initiating the polymerization of the ethylenically unsaturated monomer (i) when irradiated with ultra-voilet light; (iii) an inorganic transfer agent; (iv) an adhesion promoter; and (v) optionally, a pigment. The base coat is suitable for use in printing plastics substrates using electrostatic offset printing.

20 Claims, No Drawings

RADIATION-CURABLE COMPOSITION

CROSS-REFERENCES TO RELATED APPLICATIONS

This application claims priority of Great Britain No. PCT/GB00/04798 filed Dec. 20, 1999, the complete disclosure of which is hereby incorporated by reference.

This invention concerns a radiation-curable composition. In particular, this invention concerns a radiation-curable composition that can be used as a base coat for, for example, electrostatic offset inks.

In electrostatic offset printing an image is formed by directing one or more pigmented inks or toners on to a selectively charged drum, which are then transferred, either directly or via an intermediate member, on to a substrate. Electrostatic offset printers are made and sold by, for example, Indigo NV and by Xeikon SA.

Inks used in offset printing have difficulty adhering to certain substrates such as plastics. This can be overcome by modifying the surface of the substrate. The surface can be modified by the application of a preliminary base coat comprising, for example, a solvent-based resin such as, for example, a polyamide, a butadiene resin or an ethylene-acrylic acid resin (see JP 10076744). When a solvent-based resin is used, the solvent needs to be evaporated before printing, which can be slow, hazardous and offensive, and is environmentally unfriendly.

WO 98/49604 discloses a copolymer receptor layer which is applied by extrusion to a polyvinyl chloride backing to improve abrasion resistance of a printed image. The copolymer receptor layer can be used to improve print quality on a polycarbonate backing layer. In both of these applications, we are told that the copolymer receptor layer adheres to the polyvinyl chloride backing layer in the absence of UV radiation.

The aim of the present invention is to provide a base coat that can be used on difficult substrates, such as plastic substrates, that are printed using, for example, offset printing.

A further aim of the present invention is to provide a base coat that does not contain volatile organic solvents.

A further aim of the present invention is to provide a base coat that can be applied by screen process printing or by any other suitable coating or printing process.

In accordance with the present invention there is provided a radiation-curable composition for use as a primer base coat for electrostatic offset printing, the composition comprising:
 (i) an ethylenically unsaturated monomer, oligomer or polymer that is capable of being photopolymerized;
 (ii) a photoinitiator that is capable of initiating the polymerization of the ethylenically unsaturated monomer (i) when irradiated with ultra-violet light;
 (iii) optionally, a pigment;
 (iv) an inorganic transfer agent; and
 (v) an adhesion promoter.

In accordance with the present invention there is also provided a method for printing a substrate, the method comprising a stop of applying a base coat to the substrate before printing, the base coat comprising the composition defined above.

In accordance with the present invention there is also provided use of the composition defined above as a base coat for printing.

The base coat may be applied to a substrate using, for example, silk or screen process printing, flexographic printing, curtain coating, roller coating and spin coating.

In use, the base coat is applied to a substrate and then irradiated using ultra-violet light. The cured base coat possess excellent properties for the reception of images produced by electrostatic offset printing. The base coat can be used, for example, for printing on to compact discs, labels or similar plastics articles.

The monomer, oligomer or prepolymer (I) is preferably an ester of acrylic or methaorylic acid, such as, for example, phenoxyethyl acrylate, hexanediol diactylate, tri(propylene glycol) diacrylate, trimethylolpropane triacrylate, polyethylene glycol diacrylate hydroxyathyl methaerylate, trirnethylolpropane triacrylate, tetrahydrofurfuryl acrylate, lauryl acrylate, octyl acrylate, decyl acrylate, acrylates of polyurethane, polyester, polyether, melamine or epoxy resins, ethoxylated or propoxylated derivatives of any of the aforementioned acylates or methacrylates; or a N-vinylamide such as, for example, N-vinylcaprolaotam or N-vinylformamide; or a mixture thereof. The monomer, oligomer or prepolymer is preferably present in an amount from 10 to 80%, more preferably 40–60%, by weight of the composition.

The photoinitiator (ii) is of the typo known to produce free radicals when irradiated. The photoinitiator is, for example, benzophenone. 1-hydroxycyclohexyl phenyl ketone, 2-benzyl-2-dimethylamino-(4-morpholinaphenyl)butan-1-one, benzil dimethylketal, isopropyltnoxanthone, bis(2,6-dimethylbenzoyl)-2,4,4-trimethylpentylphosphine oxide or a mixture thereof.

Colourless or nearly colourless materials are preferred; however, yellow coloured photoinitiators may also be used. The photoinitator is preferably present in an amount from 0.5 to 20%, more preferably from 2.5 to 8%, by weight of the composition.

The inorganic transfer agent is required to ensure good transfer of electroink from the electrostatic offset press blanket to the cured basecoat. The inorganic transfer agent (iv) is preferably a silica or a modified silica. Suitable silicas are Aerosil 200 (available from Degussa) and Cab-o-sil TS610 (available from Cabot), or a mixture thereof. It is particularly advantageous to use commercial materials in which the silica or modified silica is dispersed in an ethylenically unsaturated monomer ingredient of type (i), such as, for example. Highlink OG (available from Clariant). We have found that these transfer agents, especially silicas, render the final cured ease coat particularly receptive to electrostatic offset ink. They also have the advantage of giving a desirable 'structure' to the compositions, i.e. resistance to flow under gravity without excessive viscosity at higher shear. The inorganic transfer agent (iv) is preferably present in an amount from 0.5 to 50%, more preferably from 4 to 35%, by weight of the composition.

The adhesion promoter (v) is present to aid adhesion of the electrostation offset ink to the cured base coat. Suitable materials are polar organic nitrogen compounds having a molecular weight preferably greater than 200 and preferably containing two or more nitrogen atoms such as, for example, the amines sold by Huntsman Incorporated under the name Jeffamine D230 (a diamine); and Jeffamine T403 (a triamine); or polyamides, such as, for example, Solsperse 32000 (available from Zenoca), described as a polymer acid salt/polymer amide; or a mixture thereof. It is known in the art that amines may be used to act as synergists for photoinitiators; however, in this invention, the amines are added to aid the adhesion of the polar electrostatic offset ink to the base coat. The adhesion promoter is preferably present in an amount from 5 to 25%, more preferably from 11 to 19%, by weight of the composition.

Optionally, the following additives may also be present: passive resins (i.e. resins that are not cured by ultra-violet light) to stabilise the viscosity of the composition and improve the physical properties of the cured base coat; dyes or pigments, especially white pigment to form an opaque background for the electrostatic offset print; stabilisers to prevent deterioration of the composition to heat or on storage; flow aids; biocides; defoamers; and surfactants.

The components of the base coat are preferably selected so that they are compatible with each other and provide a mixture stable on storage, with the required rheological and other properties. In particular, the compositions can preferably be formulated to give a rheological profile suitable for application by screen-printing. For this purpose their gel strength, as measured as the viscosity at 25° C. on a Brookfield RVDT digital viscomoter at 5r.p.m using a No.6 spindle, preferably lies between 18 and 1500 poise, more preferably between 100 and 600 poise, and their viscosity under higher shear, as measured on the Rotothinner (supplied by Sheen Instruments), is preferably between 3 and 65 poise, more preferably 20 and 50 poise. Alternatively, the compositions can be stared and supplied in two parts: the adhesion promoter being in one part and the rest of the composition being in the other part.

The substrate may be polycarbonate, which is used in the production of compact discs or other plastics materials such as, for example, poly(vlnyl chloride), toils or papers. Preferred substrates are plastics articles such as labels and overlay film, especially uncoated and spin-coated polycarbonate compact discs or DVD's.

The substrate may be printed using a screen stencil or by any other appropriate printing method, and then hardened by exposure to ultra-violet light or cold-cure systems. Typical exposures are at a speed of 27–50 meters/minute on a Svecia u.v. dryer having two medium pressure mercury lamps operating at 80 watts/centimetre, or at up to 56 impressions per minute with two lamps at 100% power on a Kammann K15 printer. After curing, the substrate bearing the base coat is especially suitable for receiving electrostatic offset ink.

The invention will now be described, by way of example, with reference to the following Examples (all pans are by weight):

EXAMPLE 1

The following components were mixed on a Torrance stirrer fitted with a water-cooling jacket:

| | |
|---|---|
| Hexane diacrylate | 76.8 parts |
| Jeffamine D-230 | 12.5 parts |
| 1-Hydroxycyclohexyl phenyl ketone | 2.5 parts |
| Aerosil 200 | 3.1 parts |
| Aerosil R972 | 3.1 parts |

The first two components were mixed at 50° C. to give a homogeneous solution, which was cooled for the later additions. Finally after the addition of the Aerosil 200, the speed of the stirrer was increased and the mixture was allowed to heat to 50° C. until no nibs were detected using a Hegman gauge.

The composition had a Rotothinner viscosity of 25 poise at 25° C. and Brookfield viscosity of 45 poise at 25° C.

The composition was printed on a Kammann K15H printing machine at 56 impressions per minute through a screen stenoil prepared on a mash having ISO threads per centimetre on to a blank polycarbonate compact disc, and cured with two u.v. lamps at 100% power. The resulting coated disc was an excellent substrate for an electrostatic offset ink applied by an Indigo printer.

The quality of the image printed by the Indigo printer on the coated disc was superior to one applied by screen process printing and was comparable to a lithographic print.

EXAMPLE 2

The following components were mixed using a Grieves stirrer.

| | |
|---|---|
| Highlink OG 103.53 | 80.0 parts |
| Jeffamine T403 | 12.2 parts |
| 1-Hydroxycyclohexyl phenyl ketone | 3.7 parts |
| Aerosil 200 | 3.3 parts |

The composition had a Rotothinner viscosity of 21 poise at 25° C., and a Brookfield viscosity of 510 poise at 25° C.

The composition was prepared in the same way as in Example 1.

EXAMPLE 3

The following composition was prepared:

| | |
|---|---|
| Jeffamine D-230 | 10.0 parts |
| Hexanediol diacrylate | 73.0 parts |
| Florstab UV-1 stabiliser from Kromachem Ltd | 1.0 parts |
| 1-Hydroxycyclohexyl phenyl ketone | 4.5 parts |
| Adhesion resin LTH from Huels AG | 5.5 parts |
| Aerosil 200 | 3.0 parts |
| Aerosil R972 | 3.0 parts |

The composition had a Rotothinner viscosity of 3 poise at 25° C. and a Brookfield viscosity 0 of 10 poise at 25° C.

The composition was prepared by mixing the components in the order they are given on a Torrance stirrer fitted with a water-cooling jacket. Finally the mixture was milled on a Buhler triple-roll mill until no nibs were visible on a Hegman gauge.

This composition can be provided as a two part pack with the Jeffamine D230 being in one pack and the other components being in the other pack. The Jeffamine should be combined with the other components before use.

EXAMPLE 4

The following composition was prepared:

| | |
|---|---|
| Highlink OG 103-53 | 75.3 parts |
| Jeffamine diamine D-230 | 9.3 parts |
| 1-Hydroxycyclohexyl phenyl ketone | 3.7 parts |
| Ebecryl B70 (acrylate resin from UCB) | 6.0 parts |
| Aerosil 200 | 3.0 parts |
| Hexanediol diacrylate | 2.7 parts |

The composition (before addition of the diamine) had a Rotothinner viscosity of 32 poise at 25° C. and a Brookfield viscosity of 560 poise at 25° C.

The components were mixed in the order given on a Torrance stirrer fitted with a water-cooling Jacket. After the last addition the speed of the stirrer was increased and the mixture was allowed to heat to 50° C. until no nibs were visible on a Hagman gauge.

The following composition was prepared:

| | |
|---|---|
| Highlink OG 103-53 | 61.8 parts |
| Diamine D-230 | 10.0 parts |
| 1-Hydroxycyclohexyl phenyl ketone | 3.0 parts |
| Lucerin TPO | 2.0 parts |
| Aerosil 200 | 0.7 parts |
| Finntitan RDDI pigment | 22.0 parts |

The composition was prepared as in Example 1. The composition had a rotothinner viscosity of 22 poise at 25° C. and a Brookfield viscosity of 18 poise at 25° C.

What is claimed is:

1. A radiation-curable composition for use as a primer base coat for electrostatic offset printing, the composition comprising:
   (i) an ethylenically unsaturated monomer, oligomer or polymer that is capable of being photopolymerized;
   (ii) a photoinitiator that is capable of initiating the polymerization of the ethylenically unsaturated monomer (i) when irradiated with ultraviolet light; and
   (iii) an inorganic transfer agent; and
   (iv) an adhesion promoter.

2. The radiation-curable composition of claim 1, wherein the monomer, oligomer or polymer is selected from the group consisting of esters of acrylic and methacrylic acid and N-vinylamide and mixtures thereof.

3. The radiation-curable composition of claim 2, wherein the ester is phenoxyethyl acrylate, hexanediol diacrylate, tri(propylene glycol) diacrylate, trimethylolpropane triacrylate, polyethylene glycol diacrylate, hydroxyethyl methacrylate, trimethylolpropane triacrylate, tetrahydrofurfuryl acrylate, lauryl acrylate, octyl acrylate decyl acrylate, acrylates of polyurethane, polyester, polyether, melamine or epoxy resins, ethoxylated or propoxylated derivatives of any of the aforementioned acylates or methacrylates or a mixture thereof.

4. The radiation-curable composition of claim 2 wherein the N-vinylamide is N-vinylcaprolactam or N-vinylformamide.

5. The radiation-curable composition of claim 1, wherein the monomer, oligomer or polymer is present in an amount from 10 to 80%, by weight of the composition.

6. The radiation-curable composition of claim 1, wherein the photoinitiator is benzophenone, 1-hydroxycyclohexyl phenyl ketone, 2-benzyl-2-dimethylamino-(4-morpholinophenyl)butan-1-one, benzil dimethylketal, isopropylthoxanthone, bis(2,6-dimethylbenzoyl)-2,4,4-trimethylpentyl-phosphine oxide or a mixture thereof.

7. The radiation-curable composition of claim 6, wherein the photoinitiator is colourless or substantially colourless.

8. The radiation-curable composition of claim 1, wherein the photoinitiator is present in an amount from 0.5 to 20%, by weight of the composition.

9. The radiation-curable composition of claim 1, wherein the inorganic transfer agent is a silica or modified silica.

10. The radiation-curable composition of claimed in claim 9, wherein the silica or modified silica is dispersed in the ethylenically unsaturated monomer.

11. The radiation-curable composition of claim 1, wherein the inorganic transfer agent is present in an amount from 0.5 to 50%, by weight of the composition.

12. The radiation-curable composition of claim 1, wherein the adhesion promoter is a polar organic nitrogen compound.

13. The radiation-curable composition of claim 12, wherein the adhesion promoter is a diamine, a triamine, or a mixture thereof.

14. The radiation-curable composition of claim 12, wherein the adhesion promoter is present in an amount from 5 to 25% by weight of the composition.

15. A method for printing a substrate comprising applying a primer base coat of the composition of claim 1 to the substrate before printing.

16. The method of claim 15, wherein the substrate is polycarbonate.

17. The method of claim 15 wherein the monomer, oligomer or polymer is selected from the group consisting of esters of acrylic and methacrylic acid and N-vinylamide and mixtures thereof.

18. The method of claim 15 wherein the ester is phenoxyethyl acrylate, hexanediol diacrylate, tri(propylene glycol) diacrylate, trimethylolpropane triacrylate, polyethylene glycol diacrylate, hydroxyethyl methacrylate, trimethylolpropane triacrylate, tetrahydrofurfuryl acrylate, lauryl acrylate, octyl acrylate decyl acrylate, acrylates of polyurethane, polyester, polyether, melamine or epoxy resins, ethoxylated or propoxylated derivatives of any of the aforementioned acylates or methacrylates or a mixture thereof.

19. The method of claim 15 wherein the N-vinylamide is N-vinylcaprolactam or N-vinylformamide.

20. The composition of claim 1 which further comprises a pigment.

* * * * *